(12) United States Patent
Rivera et al.

(10) Patent No.: US 10,489,211 B2
(45) Date of Patent: Nov. 26, 2019

(54) AUTOMATICALLY GENERATING LINKS FOR DATA PACKETS IN AN ELECTRONIC SYSTEM

(71) Applicant: Mitchell International, Inc., San Diego, CA (US)

(72) Inventors: Marcos Rivera, San Diego, CA (US); Scott Baierl, San Diego, CA (US); Bryan Durant, San Diego, CA (US); Russell Peters, San Diego, CA (US); Basab Dattaray, San Diego, CA (US)

(73) Assignee: MITCHELL INTERNATIONAL, INC., San Diego, CA (US)

( * ) Notice: Subject to any disclaimer, the term of this patent is extended or adjusted under 35 U.S.C. 154(b) by 71 days.

(21) Appl. No.: 15/696,078

(22) Filed: Sep. 5, 2017

(65) Prior Publication Data

US 2018/0129536 A1 May 10, 2018

Related U.S. Application Data

(63) Continuation-in-part of application No. 14/058,128, filed on Oct. 18, 2013, now abandoned.

(51) Int. Cl.
*G06F 9/50* (2006.01)
*H04L 29/06* (2006.01)

(52) U.S. Cl.
CPC ............ *G06F 9/505* (2013.01); *G06F 9/5083* (2013.01); *H04L 69/22* (2013.01)

(58) Field of Classification Search
CPC ......... G06F 9/505; G06F 9/5083; H04L 69/22
See application file for complete search history.

(56) References Cited

U.S. PATENT DOCUMENTS

| | | |
|---|---|---|
| 7,003,475 B1 | 2/2006 | Friedland et al. |
| 2002/0029161 A1 | 3/2002 | Brodersen et al. |
| 2002/0055870 A1 | 5/2002 | Thomas |
| 2003/0177027 A1 | 9/2003 | DiMarco et al. |
| 2003/0177051 A1 | 9/2003 | Driscoll et al. |
| 2014/0344826 A1* | 11/2014 | Wu ................. G06F 9/4881 718/104 |
| 2015/0112742 A1 | 4/2015 | Rivera et al. |

(Continued)

OTHER PUBLICATIONS

Final Office Action for U.S. Appl. No. 14/058,128 dated Jul. 25, 2016, 23 pages.

(Continued)

*Primary Examiner* — Sisley N Kim
(74) *Attorney, Agent, or Firm* — Kilpatrick Townsend & Stockton LLP

(57) ABSTRACT

Systems and methods of allocating execution loads to execution components are disclosed. The systems and methods select one of the execution components and one of the execution loads based on selection criteria. The systems and methods then determine whether the selected execution load may be allocated to the selected execution component. If the selected execution load may be allocated to the selected execution component, the systems and methods allocate the execution load accordingly. If the selected execution load may not be allocated to the selected execution component, the systems and methods select another one of the execution components and another one of the execution loads for attempted allocation.

21 Claims, 8 Drawing Sheets

(56) References Cited

U.S. PATENT DOCUMENTS

2015/0170078 A1* 6/2015 Dattaray .......... G06Q 10/06311
705/7.13

OTHER PUBLICATIONS

Non-Final Office Action for U.S. Appl. No. 14/058,128 dated Oct. 6, 2015, 17 pages.
Non-Final Office Action for U.S. Appl. No. 14/058,128 dated May 5, 2017, 24 pages.

* cited by examiner

AUTOMATICALLY GENERATING LINKS FOR DATA PACKETS IN AN ELECTRONIC SYSTEM

CROSS-REFERENCE TO RELATED APPLICATIONS

This application is a continuation-in-part of U.S. Non-Provisional application Ser. No. 14/058,128 filed on Oct. 18, 2013 and entitled "SYSTEM AND METHOD OF AUTOMATICALLY ALLOCATING TASKS," the contents of which are incorporated herein by reference in its entirety.

BACKGROUND

The present application generally relates to systems which generate links between sets of data packets corresponding with execution loads and sets of data packets corresponding with execution components, and more particularly to systems which generate links between data packets corresponding with execution loads and data packets corresponding with execution components, where each of the data packets corresponding with execution loads and each of the data packets corresponding with execution components are associated with a physical location.

Determining which data packets corresponding with execution loads should be linked with which data packets corresponding with execution components is complex and can require large amounts of computing resources to perform. Because the calculation is NP (nondeterministic polynomial)-complete, an optimum solution may be found only by considering all possible solutions, and comparing the solutions based on a metric or rule whose outcome is to be optimized.

The burden for finding an optimum solution increases exponentially with the number of execution loads and the number of execution components. Because all possible solutions are determined, linking the data packets corresponding with the execution loads with the data packets corresponding with the execution components is impractical for situations having more than a few execution loads and execution components.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of generating links between a plurality of data packets corresponding with execution loads to a plurality of data packets corresponding with execution components, the method including: selecting a first data packet corresponding with one of the execution loads and a first data packet corresponding with one of the execution components. The method of generating links also includes determining whether the selected first data packet corresponding with one of the execution loads is allocatable to the selected first data packet corresponding with one of the execution components; in response to the selected first data packet corresponding with one of the execution loads being determined to be allocatable to the selected first data packet corresponding with one of the execution components. The method of generating links also includes allocating the selected first data packet corresponding with one of the execution loads to the selected first data packet corresponding with one of the execution as a first allocation components. The method of generating links also includes via an electronic communications network, communicating the first allocation to the execution component of the first allocation; and in response to the selected first data packet corresponding with one of the execution loads being determined to not be allocatable to the selected first data packet corresponding with one of the execution components. The method of generating links also includes selecting a second data packet corresponding with one of the execution loads and a second data packet corresponding with one of the execution components, where the second data packet corresponding with one of the execution components is different from the first data packet corresponding with one of the execution components, and where the second data packet corresponding with one of the execution loads is different from the first data packet corresponding with one of the execution loads. The method of generating links also includes determining whether the selected second data packet corresponding with one of the execution loads is allocatable to the selected second data packet corresponding with one of the execution components, and in response to the selected second data packet corresponding with one of the execution loads being determined to be allocatable to the selected second data packet corresponding with one of the execution components. The method of generating links also includes allocating the selected second data packet corresponding with one of the execution loads to the selected second data packet corresponding with one of the execution components as a second allocation. The method of generating links also includes via the electronic communications network, communicating the second allocation to the execution component of the second allocation, and in response to the selected second data packet corresponding with one of the execution loads being determined to be not allocatable to the selected second data packet corresponding with one of the execution components: selecting a next data packet corresponding with one of the execution components and a next data packet corresponding with one of the execution loads. Other embodiments of this aspect include corresponding computer systems, apparatus, and computer programs recorded on one or more computer storage devices, each configured to perform the actions of the methods.

Implementations may include one or more of the following features. The method where each data packet corresponding with one of the execution components has an execution component availability, and selecting the first data packet corresponding with one of the execution components includes comparing the execution component availability of the data packets corresponding with the execution components and selecting the data packet corresponding with one of the execution components having the greatest availability. The method where each data packet corresponding with the execution loads has a location associated therewith, and selecting the first data packet corresponding with one of the execution components includes comparing distances between the locations of a plurality of unallocated data packets corresponding with the execution components and the location of the data packet corresponding with one of the execution components most recently allocated to the first data packet corresponding with one of the execution components, and selecting the unallocated data packet corresponding with one of the execution loads having a location closest to the location of the data packet corresponding with one of the execution loads most recently allocated to the first data packet corresponding with one of the execution components. The method further including generating a list of eligible data packets corresponding with the execution components for each data packet corresponding with one of the execution loads, where determining whether the selected first data packet corresponding with one of the execution load is allocatable to the selected first data packet corresponding with one of the execution components includes determining whether the selected first data packet corresponding with one of the execution components is included in the list of eligible data packets corresponding with the execution components for the selected first data packet corresponding with one of the execution loads. The method where determining whether the selected first data packet corresponding with one of the execution loads is allocatable to the selected first data packet corresponding with one of the execution components further includes determining whether the availability of the first data packet corresponding with one of the execution components accommodates the execution load of the first data packet corresponding with one of the execution loads. The method further including: determining a capability requirement attribute for the first data packet corresponding with one of the execution loads. The method may also include determining a capability attribute for the first data packet corresponding with one of the execution components. The method may also include where determining whether the selected first data packet corresponding with one of the execution loads is allocatable to the selected first data packet corresponding with one of the execution components includes determining whether the capability attribute of the first data packet corresponding with one of the execution components corresponds with the capability requirement attribute of the first data packet corresponding with one of the execution loads. Implementations of the described techniques may include hardware, a method or process, or computer software on a computer-accessible medium.

One general aspect includes a computer system, including: a processor; and a memory, including instructions, which when executed by the process cause the computer system to perform a method of generating links between a plurality of data packets corresponding with execution loads to a plurality of data packets corresponding with execution components, the method including. The computer system also includes selecting a first data packet corresponding with one of the execution loads and a first data packet corresponding with one of the execution components. The computer system also includes determining whether the selected first data packet corresponding with one of the execution loads is allocatable to the selected first data packet corresponding with one of the execution components; in response to the selected first data packet corresponding with one of the execution loads being determined to be allocatable to the selected first data packet corresponding with one of the execution components. The computer system also includes allocating the selected first data packet corresponding with one of the execution loads to the selected first data packet corresponding with one of the execution as a first allocation components. The computer system also includes via an electronic communications network, communicating the first allocation to the execution component of the first allocation; and in response to the selected first data packet corresponding with one of the execution loads being determined to not be allocatable to the selected first data packet corresponding with one of the execution components. The computer system also includes selecting a second data packet corresponding with one of the execution loads and a second data packet corresponding with one of the execution components, where the second data packet corresponding with one of the execution components is different from the first data packet corresponding with one of the execution components, and where the second data packet corresponding with one of the execution loads is different from the first data packet corresponding with one of the execution loads. The computer system also includes determining whether the selected second data packet corresponding with one of the execution loads is allocatable to the selected second data packet corresponding with one of the execution components, and in response to the selected second data packet corresponding with one of the execution loads being determined to be allocatable to the selected second data packet corresponding with one of the execution components. The computer system also includes allocating the selected second data packet corresponding with one of the execution loads to the selected second data packet corresponding with one of the execution components as a second allocation. The computer system also includes via the electronic communications network, communicating the second allocation to the execution component of the second allocation, and in response to the selected second data packet corresponding with one of the execution loads being determined to be not allocatable to the selected second data packet corresponding with one of the execution components. The computer system also includes selecting a next data packet corresponding with one of the execution components and a next data packet corresponding with one of the execution loads. Other embodiments of this aspect include corresponding computer systems, apparatus, and computer programs recorded on one or more computer storage devices, each configured to perform the actions of the methods.

Implementations may include one or more of the following features. The computer system where each data packet corresponding with one of the execution components has an execution component availability, and selecting the first data packet corresponding with one of the execution components includes comparing the execution component availability of the data packets corresponding with the execution components and selecting the data packet corresponding with one of the execution components having the greatest availability. The computer system where each data packet corresponding with the execution loads has a location associated therewith, and selecting the first data packet corresponding with one of the execution components includes comparing distances between the locations of a plurality of unallocated data packets corresponding with the execution components and the location of the data packet corresponding with one of the execution components most recently allocated to the first data packet corresponding with one of the execution components, and selecting the unallocated data packet corresponding with one of the execution loads having a location closest to the location of the data packet corresponding with one of the execution loads most recently allocated to the first data packet corresponding with one of the execution components. The computer system the method further including generating a list of eligible data packets corresponding with the execution components for each data packet corresponding with one of the execution loads, where determining whether the selected first data packet corresponding with one of the execution load is allocatable to the selected first data packet corresponding with one of the execution components includes determining whether the selected first data packet corresponding with one of the execution components is included in the list of eligible data packets corresponding with the execution components for the selected first data packet corresponding with one of the execution loads. The computer system where determining whether the selected first data packet corresponding with one of the execution loads is allocatable to the selected first data packet corresponding with one of the execution components further includes determining whether the availability of the first data packet corresponding with one of the execution components accommodates the execution load of the first data packet corresponding with one of the execution loads. The computer system the method further including: determining a capability requirement attribute for the first data packet corresponding with one of the execution loads. The computer system may also include determining a capability attribute for the first data packet corresponding with one of the execution components. The computer system may also include where determining whether the selected first data packet corresponding with one of the execution loads is allocatable to the selected first data packet corresponding with one of the execution components includes determining whether the capability attribute of the first data packet corresponding with one of the execution components corresponds with the capability requirement attribute of the first data packet corresponding with one of the execution loads. Implementations of the described techniques may include hardware, a method or process, or computer software on a computer-accessible medium.

One general aspect includes a computer readable medium including non-transient instructions, which, when executed by a computer, cause the computer to perform a method of allocating a plurality of tasks to a plurality of servicers, the method including: selecting a first data packet corresponding with one of the execution loads and a first data packet corresponding with one of the execution components; determining whether the selected first data packet corresponding with one of the execution loads is allocatable to the selected first data packet corresponding with one of the execution components; in response to the selected first data packet corresponding with one of the execution loads being determined to be allocatable to the selected first data packet corresponding with one of the execution components. The computer readable medium also includes allocating the selected first data packet corresponding with one of the execution loads to the selected first data packet corresponding with one of the execution as a first allocation components. The computer readable medium also includes via an electronic communications network, communicating the first allocation to the execution component of the first allocation; and in response to the selected first data packet corresponding with one of the execution loads being determined to not be allocatable to the selected first data packet corresponding with one of the execution components. The computer readable medium also includes selecting a second data packet corresponding with one of the execution loads and a second data packet corresponding with one of the execution components, where the second data packet corresponding with one of the execution components is different from the first data packet corresponding with one of the execution components, and where the second data packet corresponding with one of the execution loads is different from the first data packet corresponding with one of the execution loads. The computer readable medium also includes determining whether the selected second data packet corresponding with one of the execution loads is allocatable to the selected second data packet corresponding with one of the execution components, and in response to the selected second data packet corresponding with one of the execution loads being determined to be allocatable to the selected second data packet corresponding with one of the execution components. The computer readable medium also includes allocating the selected second data packet corresponding with one of the execution loads to the selected second data packet corresponding with one of the execution components as a second allocation. The computer readable medium also includes via the electronic communications network, communicating the second allocation to the execution component of the second allocation, and in response to the selected second data packet corresponding with one of the execution loads being determined to be not allocatable to the selected second data packet corresponding with one of the execution components. The computer readable medium also includes selecting a next data packet corresponding with one of the execution components and a next data packet corresponding with one of the execution loads. Other embodiments of this aspect include corresponding computer systems, apparatus, and computer programs recorded on one or more computer storage devices, each configured to perform the actions of the methods.

Implementations may include one or more of the following features. The computer readable medium where each data packet corresponding with one of the execution components has an execution component availability, and selecting the first data packet corresponding with one of the execution components includes comparing the execution component availability of the data packets corresponding with the execution components and selecting the data packet corresponding with one of the execution components having the greatest availability. The computer readable medium where each data packet corresponding with the execution loads has a location associated therewith, and selecting the first data packet corresponding with one of the execution components includes comparing distances between the locations of a plurality of unallocated data packets corresponding with the execution components and the location of the data packet corresponding with one of the execution components most recently allocated to the first data packet corresponding with one of the execution components, and selecting the unallocated data packet corresponding with one of the execution loads having a location closest to the location of the data packet corresponding with one of the execution loads most recently allocated to the first data packet corresponding with one of the execution components. The computer readable medium the method further including generating a list of eligible data packets corresponding with the execution components for each data packet corresponding with one of the execution loads, where determining whether the selected first data packet corresponding with one of the execution load is allocatable to the selected first data packet corresponding with one of the execution components includes determining whether the selected first data packet corresponding with one of the execution components is included in the list of eligible data packets corresponding with the execution components for the selected first data packet corresponding with one of the execution loads. The computer readable medium where determining whether the selected first data packet corresponding with one of the execution loads is allocatable to the selected first data packet corresponding with one of the execution components further includes determining whether the availability of the first data packet corresponding with one of the execution components accommodates the execution load of the first data packet corresponding with one of the execution loads. The computer readable medium the method further including: determining a capability requirement attribute for the first data packet corresponding with one of the execution loads. The computer readable medium may also include determining a capability attribute for the first data packet corresponding with one of the execution components. The computer readable medium may also include where determining whether the selected first data packet corresponding with one of the execution loads is allocatable to the selected first data packet corresponding with one of the execution components includes determining whether the capability attribute of the first data packet corresponding with one of the execution components corresponds with the capability requirement attribute of the first data packet corresponding with one of the execution loads. Implementations of the described techniques may include hardware, a method or process, or computer software on a computer-accessible medium.

DETAILED DESCRIPTION

Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

In order to link data packets corresponding with execution loads to more than a few data packets corresponding with execution components, finding an optimum solution may be impractical. However, using embodiments of systems and methods described herein, a near optimum solution may be calculated using a practical amount of computing resources and time.

Figure 1:
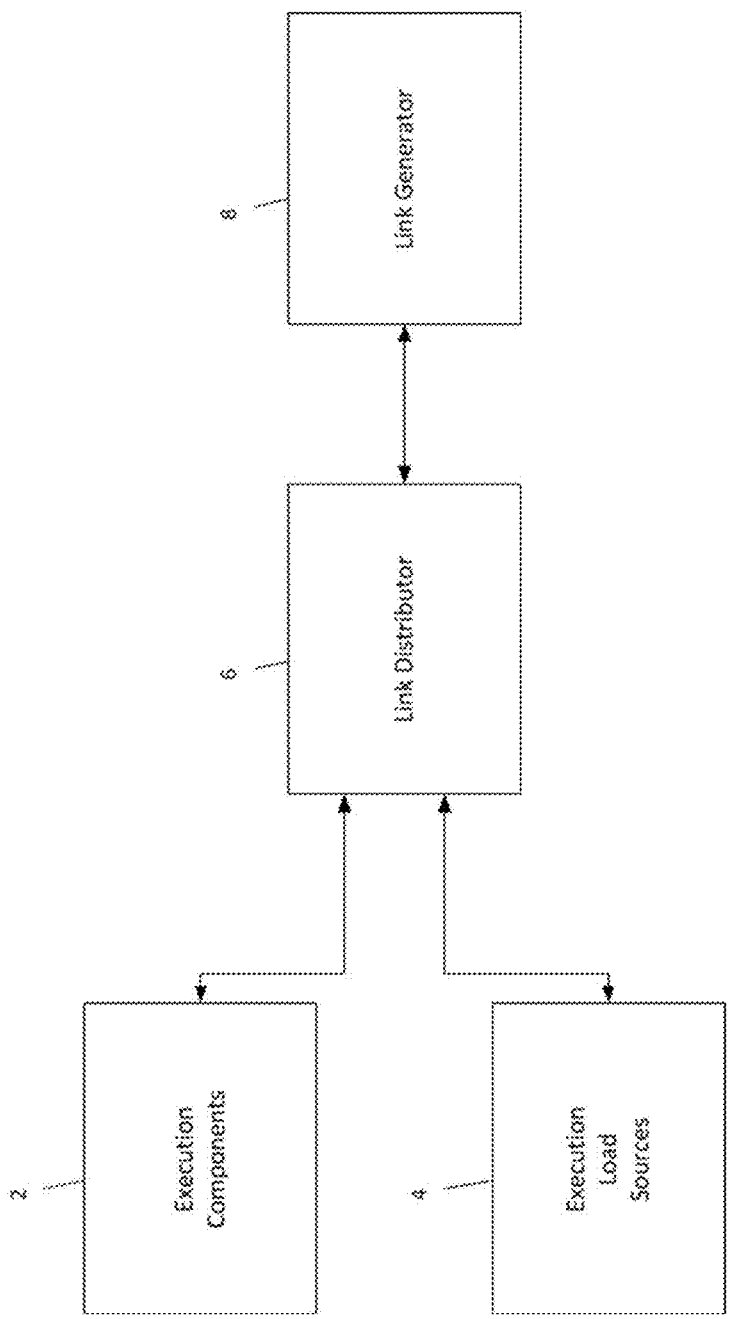
FIG. 1 is a schematic illustration of an exemplary execution load/execution component linking system.

FIG. 1 is a schematic illustration of an exemplary link generation system. The system includes data packets corresponding with execution components 2, which provide data, for example, regarding execution component characteristics, to a link distribution module 6, for example, via an electronic communications network connecting the two. The system of FIG. 1 also includes sources of execution loads 4, which generate execution loads for the link distribution module 6, and which are communicated to the link distribution module 6, for example, via an electronic communications network connecting the two. In some embodiments, the execution load sources 4 may generate instructions for links to be generated between a plurality of data packets corresponding with execution loads and a plurality of data packets corresponding with execution components.

Although the data packets corresponding with execution components 2 are represented by a single box in FIG. 1, it should be understood that a plurality of data packets corresponding with execution components are represented by the single box. Similarly, the execution load sources 4 are represented by a single box in FIG. 1, but comprise or represent a plurality of execution load sources.

The link distribution module 6 receives the data from the data packets corresponding with execution components 2 and the instructions from execution load sources 4. The data and the instructions may be packaged and delivered from the link distribution module 6 to a link generation module 8, for example, via an electronic communications network connecting the two.

The link generation module 8 receives the data regarding the data packets corresponding with execution components 2 and the instructions for links to be generated between the data packets corresponding with execution loads and the data packets corresponding with execution components and generates the links. Once the links have been generated, the link generation module 8 communicates the links to the link distribution module 6 via the network. The link distribution module 6 communicates the links for each execution component to the corresponding execution components via the network. In some embodiments, the link distribution module 6 also communicates the links for each execution load source to the respective execution load sources via the network.

Figure 2:
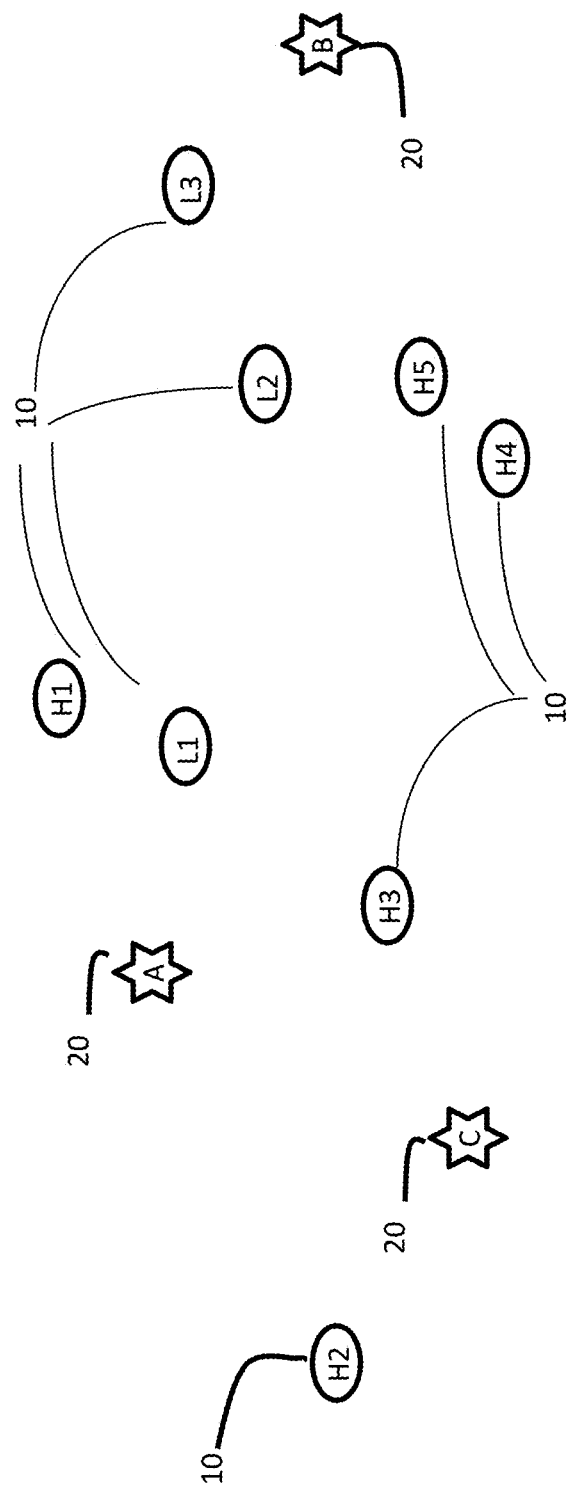
FIG. 2 is a graphical illustration of an execution load/execution component link job for an execution load linking system.

FIG. 2 is a graphical representation of an execution load/execution component link generation job for a system, such as that illustrated in FIG. 1. While the illustrated specific example may be small enough that the optimum solution may be practical, the example is for discussion purposes, and is used to illustrate various aspects and principles that may be applied to execution load/execution component link calculations that are large enough that determining the optimum solution is not practical.

The execution load/execution component link generation job presented in FIG. 2 includes multiple execution components 20 and multiple execution loads 10, which, for example, are to be completed according to a deadline considered during the execution load allocation process. For example, the execution loads 10 may be due for completion by a deadline. In some embodiments, execution loads may be due for completion by another limit, for example, by a next minute, by a next day, or by a next other limit.

In the example of FIG. 2, each of the execution loads 10 is given a priority ranking of "H" (high) or "L" (low). In addition, each of the execution loads 10 is given an execution load number for identification, where the execution load number is appended to the given ranking. Accordingly, it can be seen that there are five high-ranked tasks labeled H1-H5, and there are also three low-ranked tasks labeled L1-L3. In addition, FIG. 2 shows there are three execution components 20 labeled A, B, and C. Data packets corresponding with the execution loads are to be linked to data packets corresponding with the execution components 20 so that the execution loads 10 may be completed by execution components 20 before the deadline.

Each of the execution components 20 has attributes, which may be predetermined. For example, each execution component 20 may be associated with a physical location. Additional execution component attributes may include certifications for certain types of execution loads, or an affinity for certain execution load sources or certain types of execution load sources.

For example, each execution component 20 may be required for, or may be precluded from performing execution loads from certain execution load sources. In some embodiments, execution component attributes may include at least one attribute of a set of attributes including: physical location, one or more capabilities, and one or more availability timeslots. The execution components 20 may have other attributes.

Each of the execution loads 10 has attributes, which may be predetermined. For example, each execution load 10 may be associated with a physical location at which the execution load is to be performed. In addition, each of the execution loads 10 may have an availability slot. Additional execution load attributes may include a type of execution load, or that the execution load has special requirements, such as a specified capability. Execution load attributes may additionally or alternatively include an affinity indicator or designator for certain execution components. For example, each execution load may have a list of one or more required or precluded execution components. In some embodiments, execution load attributes additionally or alternatively may include one or more of a start time limit or an end time limit. The execution components 10 may have other attributes as well.

Numerous applications link data packets corresponding with execution loads with data packets corresponding with execution components, and may benefit from the embodiments discussed herein. For example, in a computer system computing assigning appraisals, links generated between data packets corresponding with execution components, or appraisers, and data packets corresponding with execution loads, or appraisals, are used and represent assignments of the execution loads to the execution components.

Figure 3:
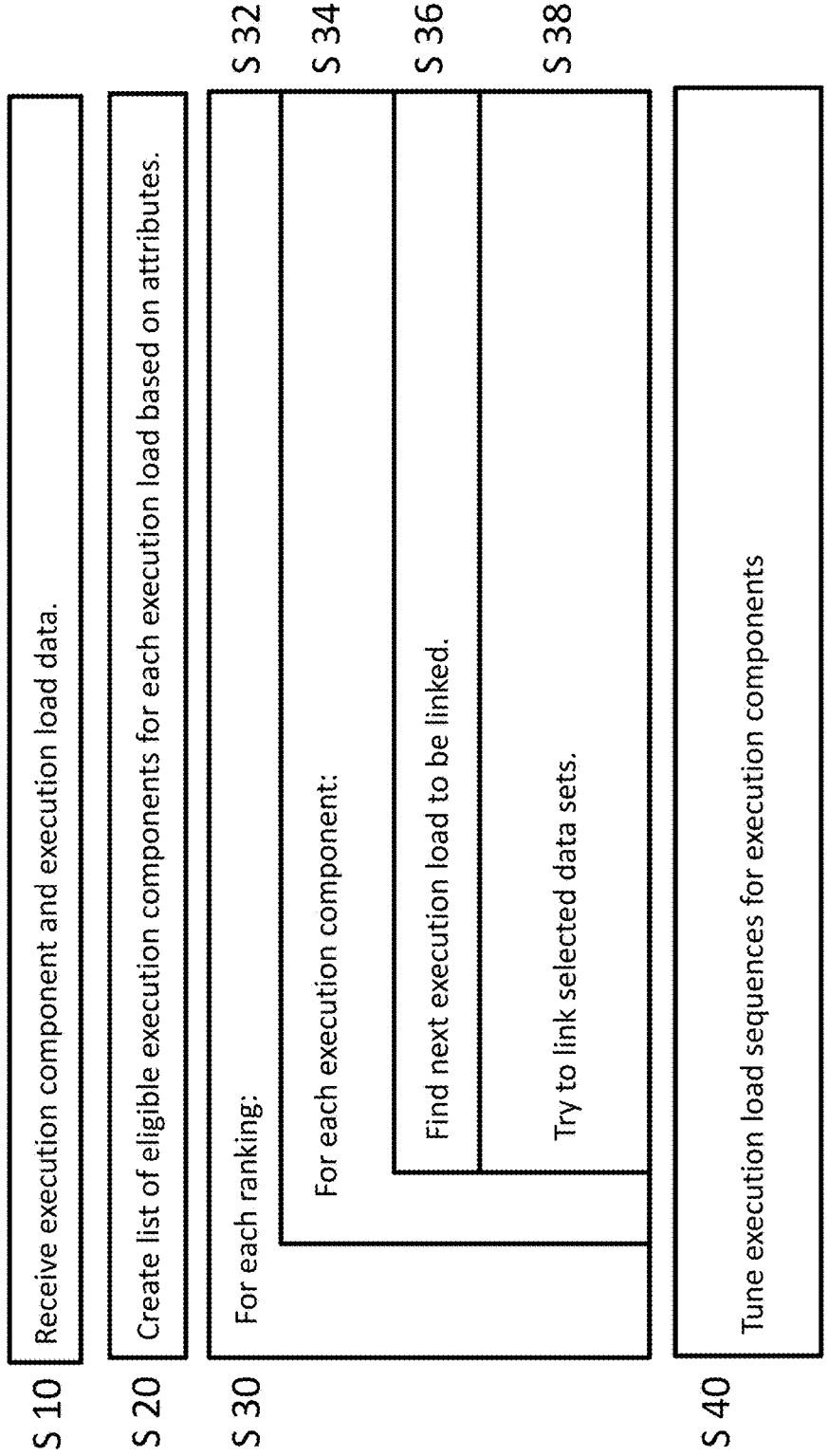
FIG. 3 is a structured flowchart diagram illustrating embodiment of a method of generating links between sets of data packets corresponding with execution loads and sets of data packets corresponding with execution components.

FIG. 3 is a structured flowchart diagram illustrating a method performed by a computer system to generate links between sets of data packets corresponding with execution loads and sets of data packets corresponding with execution components as described herein.

S 10, the computer system receives data packets corresponding with execution loads and data packets corresponding with execution components. The data packets may include data representing the physical locations associated with each of the execution loads and with each of the execution components. The data packets may also include data representing execution component attributes and execution load attributes. In some embodiments, the data packets are tested by the computer to ensure validity and usability of the data packets before further proceeding.

At S 20, the computer system generates a list of eligible data packets corresponding with execution components for each data packet corresponding with an execution load. For example, each data packet corresponding with an execution load may have predetermined requirements as defined by its execution load attributes. In addition, based on the execution component attributes, each data packet corresponding with an execution component has predetermined qualifications that may qualify or disqualify the corresponding execution component from performing the corresponding execution load. At S 20, for each data packet corresponding with an execution load, the computer system generates a list of eligible data packets corresponding with execution components based on the corresponding execution load attributes and the corresponding execution component attributes. As a result, for each data packet corresponding with an execution load, a list of data packets corresponding with eligible qualified execution components is generated.

In some embodiments, a metric called a "center of gravity" is determined for each of the execution components. The center of gravity metric may be based on, for example, the physical location of the execution component and all execution loads within a specified distance of the physical location of the execution component. In some embodiments, the center of gravity is determined based at least in part on the physical locations of a specified quantity of execution loads.

For example, the center of gravity may be based on the ten execution loads nearest a physical location of the execution component, such as the ten execution loads nearest the execution component. The center of gravity may be determined, for example, as a geometric mean of the physical locations on which the metric is based. The center of gravity may be determined in other ways, and using other sets of data.

S 30 is an iterative loop of operations, by which the computer system generates links between the data packets corresponding with the execution loads and the data packets corresponding with the execution components based in part on the lists of eligible execution components generated in operation S 20.

To do this, at S 32, the computer system determines a set of data packets corresponding with the execution loads having the highest ranking and continuing through each next highest ranking. For example, at a first occurrence of S 32, the computer system uses data packets corresponding with the execution loads having the highest ranking, and, at subsequent occurrences of S 32, iteratively changes the ranking used towards levels of less ranking as links between the data packets corresponding with the execution loads and the data packets corresponding with the execution components are generated. Initially, the computer may select all of the un-linked data packets corresponding with execution loads having the highest ranking in a particular iteration, for inclusion in the set of data packets corresponding with execution loads to be linked to execution components. As a result, data packets corresponding with execution loads are linked to data packets corresponding with execution components in order of ranking of the data packets corresponding with the execution loads, starting with the highest and proceeding to the lowest. For each set of data packets corresponding with execution loads determined at S 32, the computer system performs S 34, S 36, and S 38, as described further below. Once the computer system has performed S 34, S 36, and S 38 for each of the sets of data packets corresponding with execution loads determined at S 32, the computer system performs the operation S 40 described below.

At S 34, the computer selects a next data packet corresponding with an execution component as a candidate for linking to one of the data packets corresponding with the execution loads. For example, the computer may select a data packet corresponding with an execution component having a greatest availability. Other methods of selecting a next data packet corresponding with an execution component may be used. After a next data packet corresponding with an execution component is selected, the computer system proceeds to S 36.

At S 36, from the set of data packets corresponding with execution loads determined at S 32, the computer system selects a next data packet corresponding with an execution load as a candidate for linking. To do this, the computer selects one of the as yet un-linked data packets corresponding with execution loads of the set determined at S 32. In some embodiments, the selection of the un-linked data packet corresponding with an execution load of the set is arbitrary. In such cases, the selection may be done, for example, in numeric order, alphabetically, or according to another execution load attribute.

In some embodiments, the selection is performed according to other selection criteria. For example, the computer system may select the un-linked data packet corresponding with an execution load of the set having a physical location which is nearest the physical location of the data packet corresponding with the execution load most recently linked to the data packet corresponding with the execution component selected at S 34.

In some embodiments, the computer system selects the data packet corresponding with an execution load of the set which has a physical location nearest the center of gravity of the data packet corresponding with the execution component selected at S 34. In some embodiments, the computer system selects the data packet corresponding with an execution load of the set which has a physical location nearest the center of gravity of the data packet corresponding with the execution component selected at S 34 if the data packet corresponding with the execution component selected at S 34 has not been previously linked to other data packets corresponding with execution loads. In some embodiments, the computer system selects the data packet corresponding with the execution load of the set which has a physical location nearest the physical location of the data packet corresponding with the execution load most recently linked to the data packet corresponding with the execution component selected at S 34 if the data packet corresponding with the execution component selected at S 34 has been previously linked to other data packets corresponding with execution loads.

In some embodiments, certain data packets corresponding with execution loads may be precluded from selection based on the identity of the execution component selected in the operation S 34. For example, if a particular unlinked data packet corresponding with an execution load has been previously selected for potential linking to the data packet corresponding with the execution component selected at S 34, a repeat selection of the particular data unlinked packet corresponding with an execution load may be precluded. This may be accomplished, for example, by maintaining a list of failed linkings for each data packet corresponding with an execution component. As part of the selection process, the computer system may reference the maintained list for the data packet corresponding with the execution component selected in the operation S 34, and exclude any data packet corresponding with an execution load on the list from selection.

At S 38, the computer system determines whether the data packet corresponding with the execution load selected at S 36 may be linked to the data packet corresponding with the execution component selected at S 34. To do this, the computer system accesses the list of eligible data packets corresponding with execution components generated in the operation S 20 for the data packet corresponding with the execution load selected at S 36. If the data packet corresponding with the execution component selected at S 34 does not appear on the list of eligible data packets corresponding with execution components for the data packet corresponding with the execution load selected at S 36, the data packet corresponding with the execution load selected at S 36 may not be linked to the data packet corresponding with the execution component selected at S 34. In response, the computer returns to S 34, where a next candidate data packet corresponding with an execution component is selected.

In some embodiments, the computer system determines that the data packet corresponding with the execution load selected at S 36 may not be linked to the data packet corresponding with the execution component selected at S 34 based on other factors, not described herein. If, for any reason, the computer system determines that the data packet corresponding with the execution load selected at S 36 may not be linked to the data packet corresponding with the execution component selected at S 34, the computer system may include the data packet corresponding with the execution load selected at S 36 in the list of failed linkings for the data packet corresponding with the execution component selected at S 34.

If, however, the data packet corresponding with the execution component selected at S 34 does appear on the list of eligible data packets corresponding with execution components for the data packet corresponding with the execution load selected at S 36, the computer system determines whether the availability of the execution component of the data packet selected at S 34 may accommodate the execution load of the data packet selected at S 36. If the availability of the execution component corresponding with the data packet selected at S 34 does not accommodate the execution load of the data packet selected at S 36, the data packet corresponding with the execution load selected at S 36 may not be linked to the data packet corresponding with the execution component selected at S 34. In response, the computer system returns to S 34, and a next data packet corresponding with an execution component is selected.

If, however, the availability of the execution component corresponding with the data packet selected at S 34 does accommodate the execution load of the data packet selected at S 36, the computer system links the data packet corresponding with the execution load selected at S 36 to the data packet corresponding with the execution component selected at S 34. The computer then modifies the sequence of the execution component corresponding with the data packet selected at S 34 to include the execution load of the newly linked data packets. The modification is made according to execution load attributes of the execution load of the newly link data packets. After the data packet corresponding with the execution load selected at S 36 is linked to the data packet corresponding with the execution component selected at S 34, the computer returns to S 34 for selection of a next data packet corresponding with an execution component to consider for linking.

At the conclusion of the operation S 30, each of the data packet corresponding with the execution components will have been considered for linking with the data packets corresponding with the execution loads, and each of the data packets corresponding with execution loads will have been considered for linking with the data packets corresponding with the execution components. However, the sequence of execution loads linked to each execution component may have been determined based on the order in which the execution loads were linked. This sequence may not be optimal.

At S 40, the execution load sequence for each of the execution components is optimized. Various optimization routines may be used. In some embodiments, the physical locations of the execution loads for an execution component are used as a basis for optimizing the execution load sequence of the execution component. For example, the execution load located nearest the execution component or at the next previous execution load in the execution sequence of the execution component may be included as the next execution load to be performed in the execution load sequence of the execution component. In some embodiments, selection of a next execution load to be performed is based at least in part on a geometric analysis of a representation of the physical locations. For each candidate next execution load, an angle may be determined, where the determined angle is formed between first and second line segments in the representation. The first line segment connects the current execution load and the next previous execution load, and the second line segment connects the current execution load and the candidate next execution load. Candidate next execution loads having angles nearest 180° may be preferred in the selection process, for example by selecting the candidate next execution load having the angle nearest 180° or by weighting the angle with other selection factors. In some embodiments, candidate next execution loads having angles nearest 0° may be preferred in the selection process.

Once the execution load sequence for the execution components has been optimized, the sequence of one or more of the execution components may have been optimized such that it could accommodate one or more additional execution loads. Accordingly, in some embodiments, S 10 through S 40 may be repeated one or more times to include additional execution loads to the sequences of the execution components. The execution load sequence for each of the execution components are then communicated to the corresponding execution components.

Figure 4:
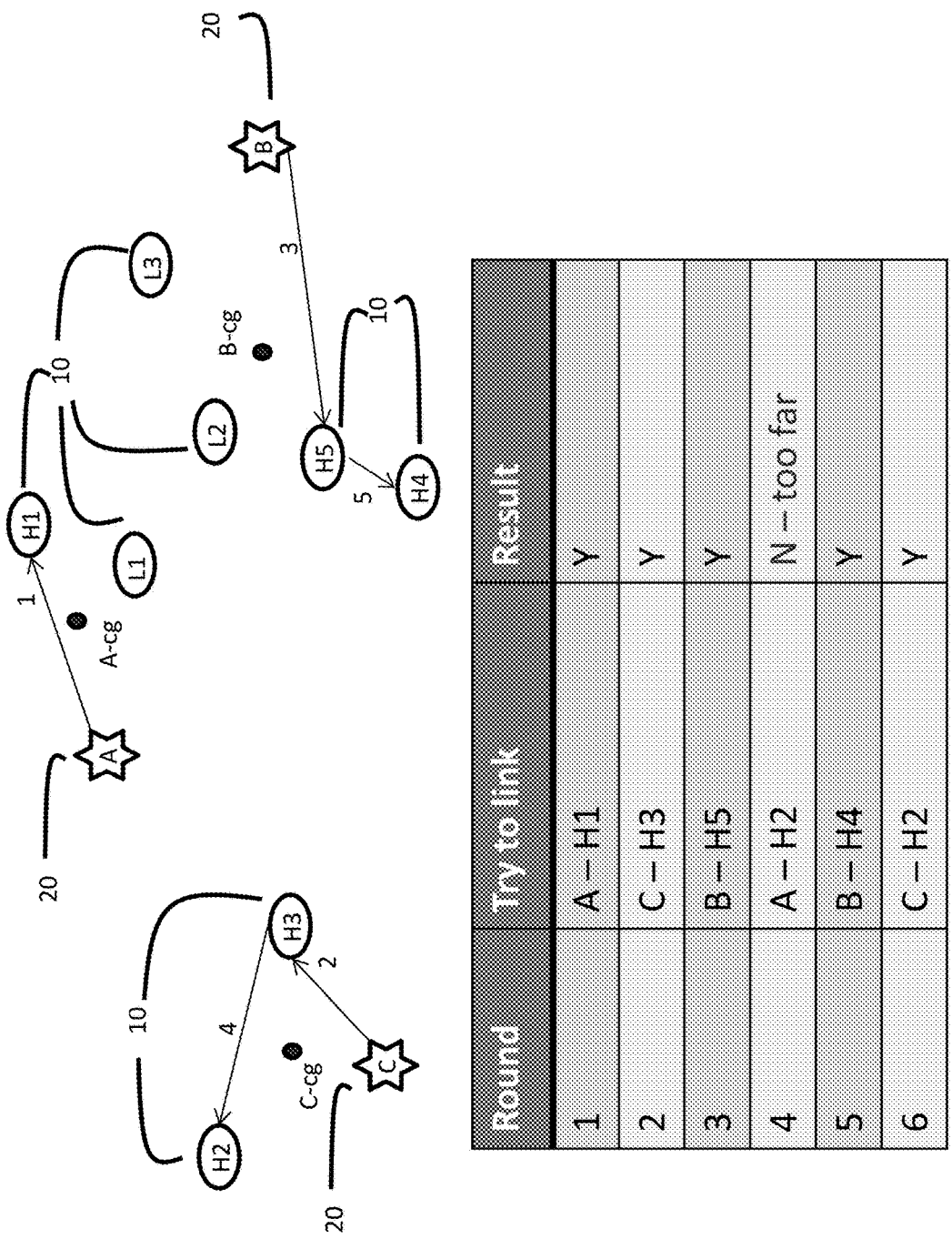
FIG. 4 is a graphical illustration of an execution component/execution load linking job.

FIG. 4 includes a graphical illustration of an execution component/execution load linking job, and includes a table of operations executed by the computer system in performing the method of FIG. 3 to determine a solution. The job illustrated in FIG. 4 includes execution components 20 and execution loads 10. Each of the execution loads 10 is designated with a priority ranking of "H" (high) or "L" (low). In addition, each of the execution loads 10 is designated with an execution load number for identification, where the execution load number is appended to the designated ranking, as shown in FIG. 4.

The table of FIG. 4 illustrates the activity at each occurrence of S 38 as a computer system performs the method represented by the structured flow diagram of FIG. 3. The operations of S 38 are performed iteratively, each occurrence after another. In each occurrence of S 38, the computer determines whether the data packet corresponding with the execution load previously selected at S 36 may be linked to the data packet corresponding with the execution component previously selected at S 34, and links the data packet corresponding with the execution load selected at S 36 with the data packet corresponding with the execution component selected at S 34 if appropriate. The computer system otherwise processes the next data packet corresponding with the execution component selected at S 34.

Prior to the first occurrence (i.e., first iteration) of the operation S 38, the computer system selects a data packet corresponding with execution component A, and a data packet corresponding with execution load H1, in operations S 34 and S 36, respectively. In the first occurrence of the operation S 38, represented by the data in the table for the row marked "Round 1", the computer system determines that the data packet corresponding with execution load may be linked to the data packet corresponding with execution component A based on, for example, the execution load H1 being less than a maximum distance from the physical location of the data packet corresponding with execution component A. As a result, the computer system links the data packet corresponding with execution load H1 to the data packet corresponding with execution component A.

The computer then repeats the operations S 34 and S 36, selecting the data packet corresponding with execution component C and the data packet corresponding with execution load H3. In the second occurrence of the operation S 38, represented by the data in the FIG. 4 table for the row marked "Round 2", the computer system determines that the data packet corresponding with execution load H3 may be linked to data packet corresponding with execution component C. Therefore, the computer system links the data packet corresponding with execution load H3 to the data packet corresponding with execution component C.

The computer system again repeats the operations S 34 and S 36, selecting the data packet corresponding with execution component B and the data packet corresponding with execution load H5. In the third occurrence of the operation S 38, the computer determines that the data packet corresponding with execution load H5 may be linked to the data packet corresponding with execution component B, represented by the data for the row marked "Round 3". In response, the computer system links the data packet corresponding with execution load H5 to the data packet corresponding with execution component B.

The computer system then repeats the operations S 34 and S 36, selecting the data packet corresponding with execution component A and the data packet corresponding with execution load H2. In the fourth occurrence of S 38, represented by the data for the row marked "Round 4", the computer determines that the data packet corresponding with execution load H2 may not be linked to the data packet corresponding with execution component A based on, for example, execution load H2 being located greater than a maximum distance from the physical location of the previous execution load of execution component A (execution load H1).

In response to the data packet corresponding with execution load H2 not being linkable to the data packet corresponding with execution component A, the computer system does not link the data packet corresponding with execution load H2 to the data packet corresponding with execution component A. Instead, the computer system records the failed linkage attempt, and repeats the operations S 34 and S 36, selecting the data packet corresponding with execution component B and the data packet corresponding with execution load H4. In the fifth occurrence of the operation S 38, represented by the data for the row marked "Round 5", the computer system determines that the data packet corresponding with execution load H4 may be linked to the data packet corresponding with execution component B. Accordingly, the computer system links the data packet corresponding with execution load H4 to the data packet corresponding with execution component B.

The computer system then repeats operations S 34 and S 36, selecting the data packet corresponding with execution component C and the data packet corresponding with execution load H2. In the sixth occurrence of the operation S 38, represented by the data for the row marked "Round 6", the computer determines that the data packet corresponding with execution load H2 may be linked to the data packet corresponding with execution component C. In response, the computer system links the data packet corresponding with execution load H2 to the data packet corresponding with execution component C.

Figure 5:
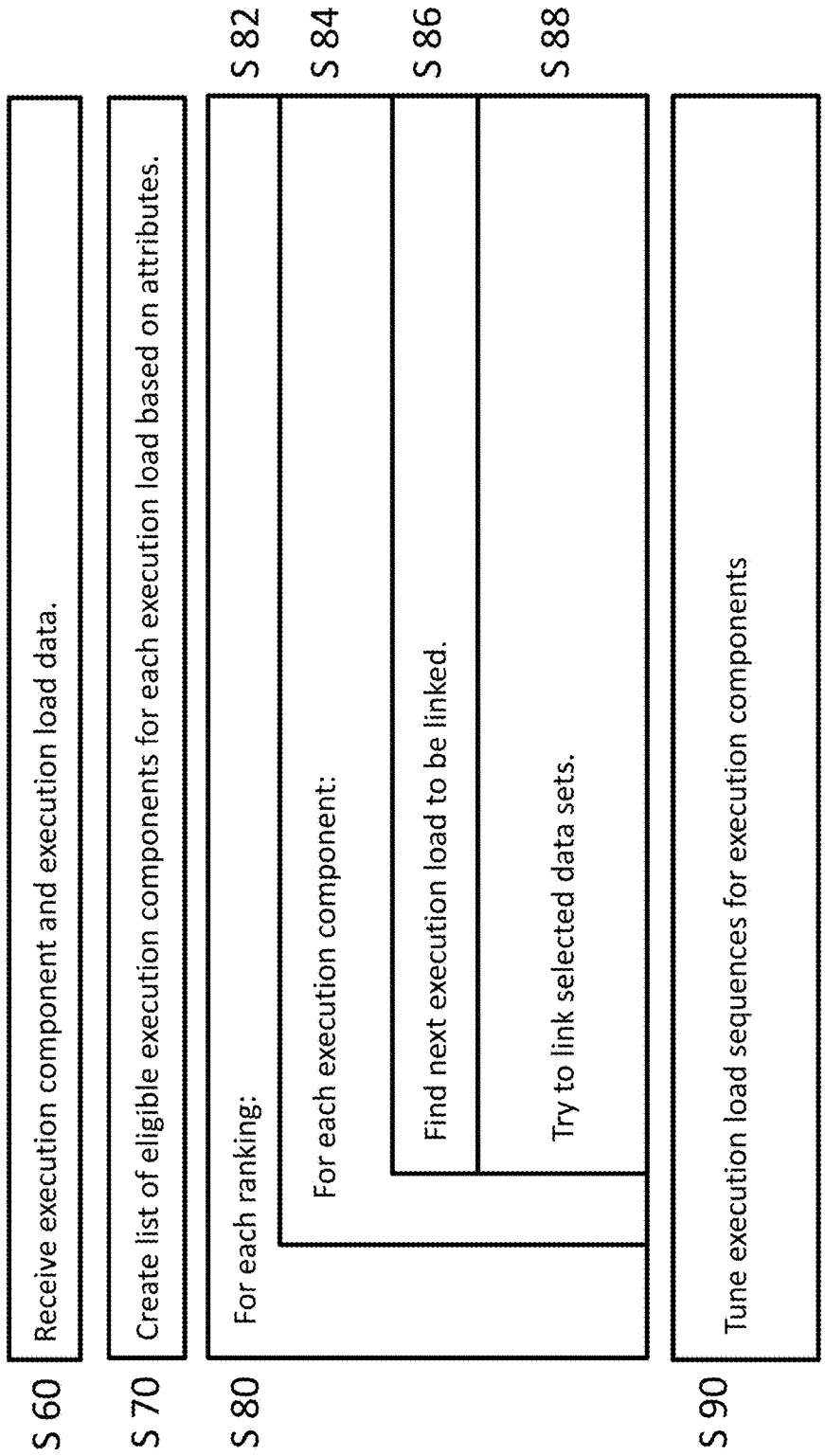
FIG. 5 is a structured flowchart diagram illustrating an embodiment of a method of generating links between sets of data packets corresponding with execution loads and sets of data packets corresponding with execution components.

FIG. 5 is a structured flowchart diagram illustrating a method performed by a computer system to generate links between sets of data packets corresponding with execution loads and sets of data packets corresponding with execution components as described herein.

In the operation S 60, the computer system receives data packets corresponding with execution loads and data packets corresponding with execution components. The data packets may include data representing the physical locations associated with each of the execution loads and with each of the execution components. The data packets may also include data representing execution component attributes and execution load attributes. In some embodiments, the data packets are tested by the computer to ensure validity and usability of the data packets before further proceeding.

At S 70, the computer system generates a list of eligible data packets corresponding with execution components for each data packet corresponding with an execution load. For example, each data packet corresponding with an execution load may have predetermined requirements as defined by its execution load attributes. In addition, based on the execution component attributes, each data packet corresponding with an execution component has predetermined qualifications that may qualify or disqualify the corresponding execution component from performing the corresponding execution load. At S 70, for each data packet corresponding with an execution load, the computer system generates a list of eligible data packets corresponding with execution components based on the corresponding execution load attributes and the corresponding execution component attributes. As a result, for each data packet corresponding with an execution load, a list of data packets corresponding with eligible qualified execution components is generated.

In some embodiments, a metric called a "center of gravity" is determined for each of the execution components. The center of gravity metric may be based on, for example, the physical location of the execution component and all execution loads within a specified distance of the physical location of the execution component. In some embodiments, the center of gravity is determined based at least in part on the physical locations of a specified quantity of execution loads. For example, the center of gravity may be based on the ten execution loads nearest a physical location of the execution component, such as the ten execution loads nearest the execution component. The center of gravity may be determined, for example, as a geometric mean of the physical locations on which the metric is based. The center of gravity may be determined in other ways, and using other sets of data.

S 80 is an iterative loop of operations, by which the computer system generates links between the data packets corresponding with the execution loads and the data packets corresponding with the execution components based in part on the lists of eligible execution components generated in operation S 70.

To do this, at S 82, the computer system determines a set of data packets corresponding with the execution loads having the highest ranking and continuing through each next highest ranking. For example, at a first occurrence of S 82, the computer system uses data packets corresponding with the execution loads having the highest ranking, and at subsequent occurrences of S 82, iteratively changes the ranking used towards levels of less ranking as links between the data packets corresponding with the execution loads and the data packets corresponding with the execution components are generated. Initially, the computer may select all of the un-linked data packets corresponding with execution loads having the highest ranking in a particular iteration, for inclusion in the set of data packets corresponding with execution loads to be linked to execution components. As a result, data packets corresponding with execution loads are linked to data packets corresponding with execution components in order of ranking of the data packets corresponding with the execution loads, starting with the highest and proceeding to the lowest. For each set of data packets corresponding with execution loads determined at S 82, the computer system performs S 84, S 86, and S 88, as described further below. Once the computer system has performed S 84, S 86, and S 88 for each of the sets of data packets corresponding with execution loads determined at S 82, the computer system performs the operation S 90 described below.

At S 84, the computer selects a next data packet corresponding with an execution component as a candidate for linking to one of the data packets corresponding with the execution loads. For example, the computer may select a data packet corresponding with an execution component having a greatest availability. Other methods of selecting a next data packet corresponding with an execution component may be used. After a next data packet corresponding with an execution component is selected, the computer system proceeds to S 86.

At S 86, from the set of data packets corresponding with execution loads determined at S 82, in some embodiments, the computer system modifies the set determined at S 82 such that the modified set includes only those data packets corresponding with execution loads which may be linked to the data packets corresponding with execution components selected in the operation S 84.

To do this, the computer selects one of the as yet un-linked data packets corresponding with execution loads of the set determined at S 32. In some embodiments, the selection of the un-linked data packets corresponding with execution loads of the set is arbitrary. In such cases, the selection may be done, for example, in numeric order, alphabetically, or according to another execution load attribute.

In some embodiments, the selection is performed according to other selection criteria. For example, the computer system may select the un-linked data packet corresponding with an execution loads of the set having a physical location which is nearest the physical location of the data packet corresponding with the execution load most recently linked to the data packet corresponding with the execution component selected at S 84.

In some embodiments, the computer system selects the data packet corresponding with an execution load of the set which has a physical location nearest the center of gravity of the data packet corresponding with the execution component selected at S 84. In some embodiments, the computer system selects the data packet corresponding with an execution load of the set which has a physical location nearest the center of gravity of the data packet corresponding with the execution component selected at S 84 if the data packet corresponding with the execution component selected at S 84 has not been previously linked to other data packets corresponding with execution loads. In some embodiments, the computer system selects the data packet corresponding with the execution load of the set which has a physical location nearest the physical location of the data packet corresponding with the execution load most recently linked to the data packet corresponding with the execution component selected at S 84 if the data packet corresponding with the execution component selected at S 84 has been previously linked to other data packets corresponding with execution loads.

In some embodiments, certain data packets corresponding with execution loads may be precluded from selection based on the identity of the execution component selected in the operation S 84. For example, if a particular unlinked data packet corresponding with an execution load has been previously selected for potential linking to the data packet corresponding with the execution component selected at S 84, a repeat selection of the particular data unlinked packet corresponding with an execution load may be precluded. This may be accomplished, for example, by maintaining a list of failed linkings for each data packet corresponding with an execution component. As part of the selection process, the computer system may reference the maintained list for the data packet corresponding with the execution component selected in the operation S 84, and exclude any data packet corresponding with an execution load on the list from selection.

At S 88, the computer system determines whether the data packet corresponding with the execution load selected at S 86 may be linked to the data packet corresponding with the execution component selected at S 84. To do this, the computer system accesses the list of eligible data packets corresponding with execution components generated in the operation S 70 for the data packet corresponding with the execution load selected at S 86. If the data packet corresponding with the execution component selected at S 84 does not appear on the list of eligible data packets corresponding with execution components for the data packet corresponding with the execution load selected at S 86, the data packet corresponding with the execution load selected at S 86 may not be linked to the data packet corresponding with the execution component selected at S 84. In response, the computer returns to S 84, where a next candidate data packet corresponding with an execution component is selected.

In some embodiments, the computer system determines that the data packet corresponding with the execution load selected at S 86 may not be linked to the data packet corresponding with the execution component selected at S 84 based on other factors, not described herein. If, for any reason, the computer system determines that the data packet corresponding with the execution load selected at S 86 may not be linked to the data packet corresponding with the execution component selected at S 84, the computer system may include the data packet corresponding with the execution load selected at S 86 in the list of failed linkings for the data packet corresponding with the execution component selected at S 84.

If, however, the data packet corresponding with the execution component selected at S 84 does appear on the list of eligible data packets corresponding with execution components for the data packet corresponding with the execution load selected at S 86, the computer system determines whether the availability of the execution component of the data packet selected at S 84 may accommodate the execution load of the data packet selected at S 86. If the availability of the execution component corresponding with the data packet selected at S 84 does not accommodate the execution load of the data packet selected at S 86, the data packet corresponding with the execution load selected at S 86 may not be linked to the data packet corresponding with the execution component selected at S 84. In response, the computer system returns to S 84, and a next candidate data packet corresponding with an execution component is selected.

If, however, the availability of the execution component corresponding with the data packet selected at S 84 does accommodate the execution load of the data packet selected at S 86, the computer system links the data packet corresponding with the execution load selected at S 86 to the data packet corresponding with the execution component selected at S 84. The computer then modifies the sequence of the execution component corresponding with the data packet selected at S 84 to include the execution load of the newly linked data packets. The modification is made according to execution load attributes of the execution load of the newly link data packets. After the data packet corresponding with the execution load selected at S 86 is linked to the data packet corresponding with the execution component selected at S 84, the computer returns to S 86 for selection of a next data packet corresponding with an execution load to consider for linking with the data packet corresponding with the execution component selected at S 84.

At the conclusion of the operation S 80, each of the data packet corresponding with the execution components will have been considered for linking with the data packets corresponding with the execution loads, and each of the data packets corresponding with execution loads will have been considered for linking with the data packets corresponding with the execution components. However, the sequence of execution loads linked to each execution component may have been determined based on the order in which the execution loads were linked. This sequence may not be optimal.

At S 90, the execution load sequence for each of the execution components is optimized. Various optimization routines may be used. In some embodiments, the physical locations of the execution loads for an execution component are used as a basis for optimizing the execution load sequence of the execution component. For example, the execution load located nearest an execution component or at the next previous execution load in the execution sequence of the execution component may be included as the next execution load to be performed in the execution load sequence of the execution component. In some embodiments, selection of a next execution load to be performed is based at least in part on a geometric analysis of a representation of the physical locations. For each candidate next execution load, an angle may be determined, where the determined angle is formed between first and second line segments in the representation. The first line segment connects the current execution load and the next previous execution load, and the second line segment connects the current execution load and the candidate next execution load. Candidate next execution loads having angles nearest 180° may be preferred in the selection process, for example by selecting the candidate next execution load having the angle nearest 180° or by weighting the angle with other selection factors. In some embodiments, candidate next execution loads having angles nearest 0° may be preferred in the selection process.

Once the execution load sequence for the execution components has been optimized, the sequence of one or more of the execution components may have been optimized such that it could accommodate one or more additional execution loads. Accordingly, in some embodiments, S 60 through S 90 may be repeated one or more times to include additional execution loads to the sequences of the execution components. The execution load sequence for each of the execution components are then communicated to the corresponding execution components.

Figure 6:
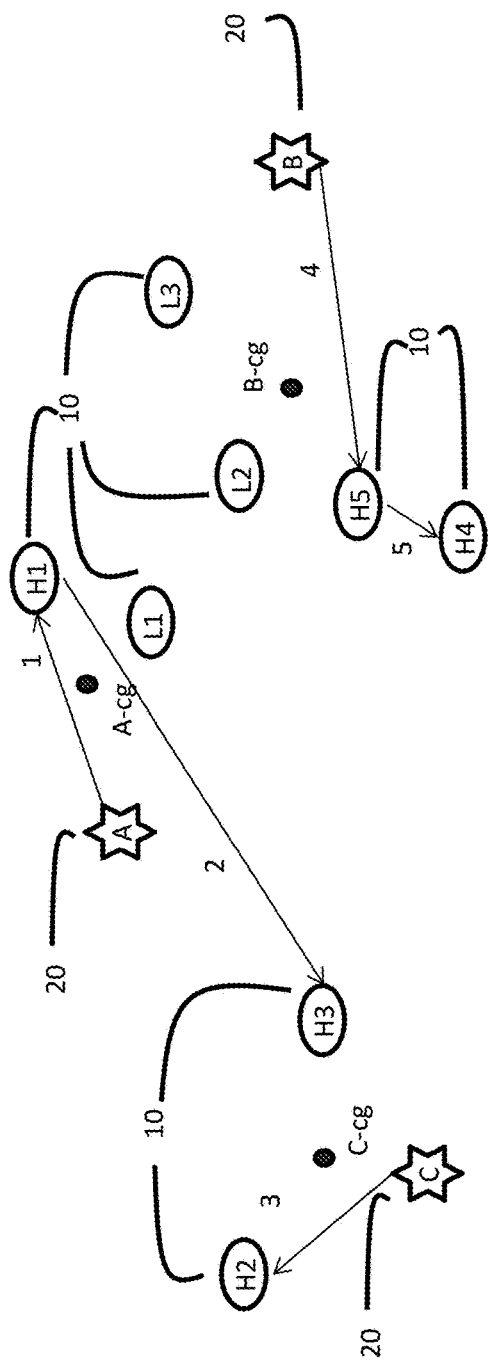
FIG. 6 is a graphical illustration of an execution component/execution load linking job.

FIG. 6 includes a graphical illustration of an execution component/execution load linking job, and includes a table of operations executed by the computer system in performing the method of FIG. 5 to determine a solution. The job illustrated in FIG. 6 includes execution components 20 and execution loads 10. Each of the execution loads 10 is designated with a priority ranking of "H" (high) or "L" (low). In addition, each of the execution loads 10 is designated with an execution load number for identification, where the execution load number is appended to the designated ranking, as shown in FIG. 4.

The table of FIG. 6 illustrates the activity at each occurrence of S 88 as a computer system performs the method represented by the structured flow diagram of FIG. 5. The operations of S 88 are performed iteratively, each occurrence after another. In each occurrence of S 88, the computer determines whether the data packet corresponding with the execution load previously selected at S 86 may be linked to the data packet corresponding with the execution component previously selected at S 84, and links the data packet corresponding with the execution load selected at S 86 with the data packet corresponding with the execution component selected at S 84 if appropriate. The computer system otherwise processes the next data packet corresponding with the execution load selected at S 86.

Prior to the first occurrence of the operation labeled S 88, the computer system selects the data packet corresponding with the execution component A, and the data packet corresponding with the execution load H1, in the operations labeled S 84 and S 86, respectively. FIG. 5 and FIG. 6 show that, in the first occurrence of S 88, the computer system determines that the data packet corresponding with the execution load H1 may be linked to the data packet corresponding with the execution component A based on, for example, the execution load H1 being closest to the center of gravity of execution component A. As a result, the computer system links the data packet corresponding with execution load H1 to the data packet corresponding with execution component A.

In response to the data packet corresponding with execution load H1 being linked to the data packet corresponding with execution component A, the computer system then repeats the operation S 86, selecting the data packet corresponding with the execution load H3. In the second occurrence of the operation S 88, the computer determines that the data packet corresponding with the execution load H3 may be linked to the data packet corresponding with the execution component A. Therefore, the computer system links the data packet corresponding with execution load H3 to the data packet corresponding with execution component A.

In response to the data packet corresponding with execution load H1 being linked to the data packet corresponding with execution component A, the computer system then repeats the operation S 86, selecting the data packet corresponding with the execution load H2. In the third occurrence of the operation S 88, the computer system determines that the data packet corresponding with the execution load H2 may not be linked to the data packet corresponding with the execution component A. Therefore, the computer system does not link the data packet corresponding with execution load H2 to the data packet corresponding with execution component A.

In response to the data packet corresponding with execution load H2 not being linkable to the data packet corresponding with execution component A, the computer then repeats the operations S 84 and S 86, selecting the data packet corresponding with execution component C and the data packet corresponding with load H2. In the fourth occurrence of the operation S 88, the computer determines that the data packet corresponding with execution load H2 may be linked to the data packet corresponding with execution component C. Therefore, the computer system links the data packet corresponding with execution load H2 to the data packet corresponding with execution component C.

In response to the data packet corresponding with execution load H2 being linked or being linkable to the data packet corresponding with execution component A, the computer then repeats the operation S 86, selecting the data packet corresponding with execution load H4. In the fifth occurrence of the operation S 88, the computer determines that the data packet corresponding with execution load H4 may not be allocated to the data packet corresponding with execution component C. Therefore, the computer system does not link the data packet corresponding with execution load H4 to the data packet corresponding with execution component C.

In response to the data packet corresponding with execution load H4 not being linkable to the data packet corresponding with execution component C, the computer then repeats the operations S 84 and S 86, selecting the data packet corresponding with execution component B and the data packet corresponding with execution load H5. In the sixth occurrence of the operation S 88, the computer determines that the execution load H2 may be allocated to execution component B. Therefore, the computer system links the data packet corresponding with execution load H2 to the data packet corresponding with execution component B.

In response to the data packet corresponding with execution load H2 being linked or being linkable to the data packet corresponding with execution component B, the computer system then repeats S 86, selecting the data packet corresponding with execution load H4. In the seventh occurrence of the operation S 88, the computer determines that the execution load H4 may be allocated to Execution component C. Therefore, the computer system links the data packet corresponding with execution load H4 to the data packet corresponding with execution component C.

As no further data packets are to be linked, the computer system may optimize the execution load sequence for each of the execution components.

Figure 7:
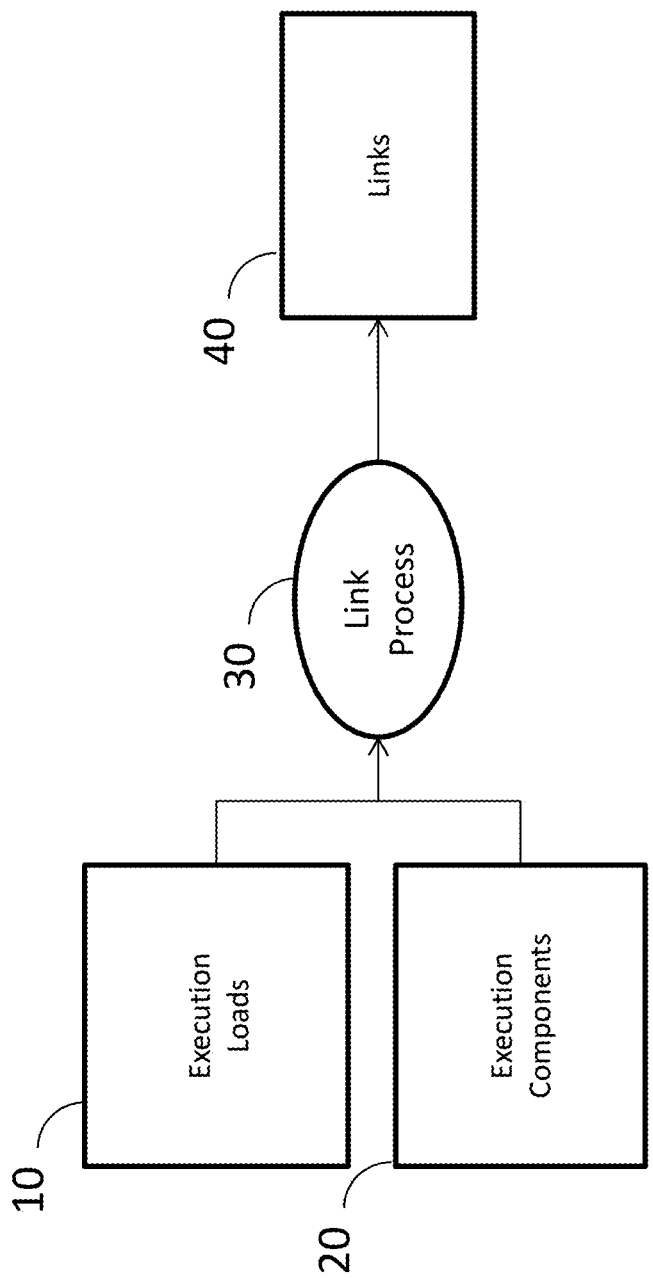
FIG. 7 shows a configuration for an exemplary execution load/execution component linking process.

FIG. 7 is a schematic diagram of an embodiment of a process having features described herein. Execution loads 50 and execution components 52 are inputs to execution load/execution component linking process 54. As shown, execution load/execution component linking process 54 generates a plurality of execution load/execution component links 56, where each link 56 represents a connection between an execution load and an execution component. In some embodiments, each particular link is communicated via a network to either or both of the execution component associated with the link and the source of the execution load associated with the link.

Figure 8:
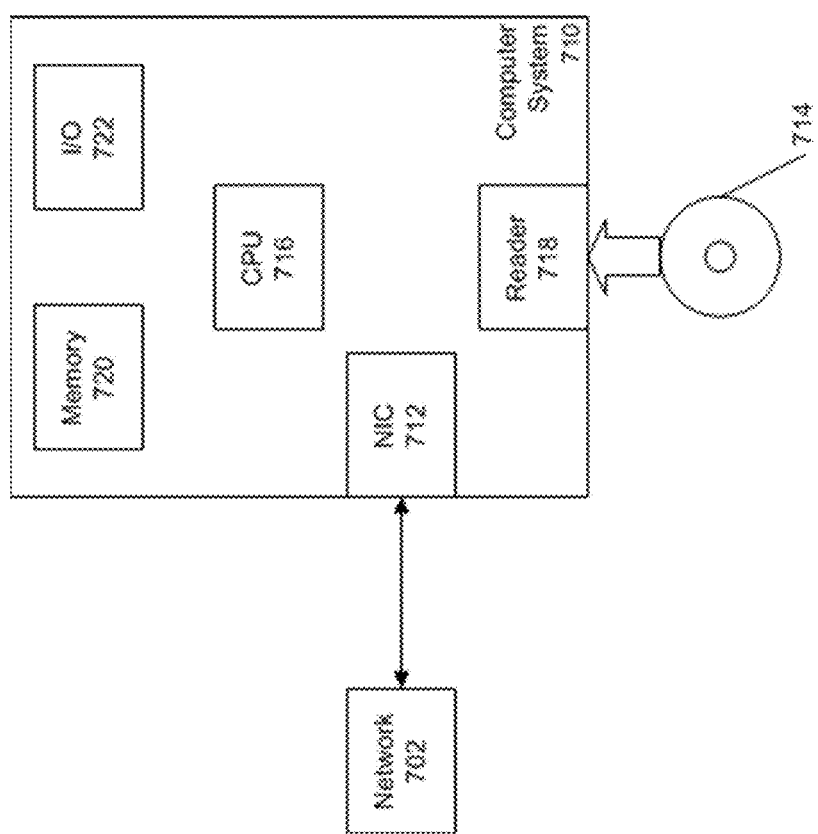
FIG. 8 shows a configuration for a computer system constructed in accordance with the present disclosure.

FIG. 8 shows a configuration for a computer system 710 constructed in accordance with the present disclosure. The computer system 710 can comprise a system such as a personal computer or server computer or the like. The computer system 710 may include a network communication interface 712 that permits communications with a network 702. The network interface can comprise a network interface card (NIC). The computer system 710 can execute instructions to provide a computer system which performs various aspects and principles of the methods and features described herein.

The computer system 710 includes a central processor unit 716 (CPU) and a program product reader 718 for receiving a program product media and reading program instructions recorded thereon, where the instructions, when executed by the computer cause the computer to perform various aspects and principles of the methods and features described herein. The computer system also includes associated memory 720 and input/output facilities 722, such as a display for output and a keyboard and/or mouse for input. The processor 716 of the computer system 710 can receive program instructions into the program memory of the processor. The program instructions can be received directly, such as by flashing EEPROM of the processor, or can be received through the network interface 712, such as by download from a connected device or over a WAN or LAN network communication. If desired, the program instructions can be stored on a computer program product 714 that is read by the computer system 710 so that the program instructions can thereafter executed. That is, the program product 714 is for use in a system such as the computer system 710, wherein the program product comprises a tangible, non-transitory recordable media containing a program of computer-readable instructions that are executable by the device processor 704 to perform the operations described herein. The program product 714 can comprise, for example, optical program media such as CD or DVD data discs, or flash memory drives, or external memory stores, or floppy magnetic disks, and the like.

The present invention has been described above in terms of presently preferred embodiments so that an understanding of the present invention can be conveyed. There are, however, many configurations for network devices and management systems not specifically described herein but with which the present invention is applicable. The present invention should therefore not be seen as limited to the particular embodiments described herein, but rather, it should be understood that the present invention has wide applicability with respect to network devices and management systems generally. All modifications, variations, or equivalent arrangements and implementations that are within the scope of the attached claims should therefore be considered within the scope of the invention.

What is claimed is:

1. A method of generating allocations between a plurality of data packets corresponding with execution loads and a plurality of execution components, the method comprising:
    selecting a first data packet, wherein the first data packet corresponds with a first of the execution loads;
    selecting a first execution component;
    determining whether the selected first data packet is allocatable to the selected first executive component;
    in response to the selected first data packet being determined to be allocatable to the selected first execution component:
        allocating the selected first data packet to the selected first execution component as a first allocation, and
        via an electronic communications network, communicating the first allocation to the first execution component; and
    in response to the selected first data packet being determined to not be allocatable to the selected first execution component:
        selecting a second data packet, wherein the second data packet corresponds with a second of the execution loads,
        selecting a second execution component,
        wherein the second execution load is different from the first execution load, and
        wherein the second execution component is different from the first execution component,
    determining whether the selected second data packet is allocatable to the selected second execution component, and
    in response to the selected second data packet being determined to be allocatable to the selected second execution component:
        allocating the selected second data packet to the selected second execution component as a second allocation, and
        via the electronic communications network, communicating the second allocation to the second execution component, and
    in response to the selected second data packet being determined to be not allocatable to the selected second execution component:
        selecting a third data packet, wherein the third data packet corresponds with a third of the execution loads, and
        selecting a third execution load.

2. The method of claim 1, wherein each execution component has an execution component availability, and selecting the first execution component comprises comparing the execution component availability of the execution components and selecting the execution component having the greatest availability.

3. The method of claim 1, wherein each data packet has a location associated therewith, and selecting the first data packet comprises comparing distances between the locations of a plurality of unallocated data packets and a location of the execution component most recently allocated, and selecting the unallocated data packet having a location closest to the location of the execution component most recently allocated.

4. The method of claim 1, further comprising generating a list of eligible execution components for each data packet, wherein determining whether the selected first data packet is allocatable to the selected first execution components comprises determining whether the selected first execution component is included in the list of eligible execution components for the selected first data packet.

5. The method of claim 4, wherein determining whether the selected first data packet is allocatable to the selected first execution component further comprises determining whether an availability of the first execution component accommodates the execution load of the first data packet.

6. The method of claim 5, wherein the availability of the first execution component is represented in a schedule having an event comprising:
    a duration,
    an earliest start time, and
    a latest end time.

7. The method of claim 1, further comprising:
    determining a capability requirement attribute for the first data packet; and
    determining a capability attribute for the first execution component,
    wherein determining whether the selected first data packet is allocatable to the selected first execution component comprises determining whether the capability attribute of the first execution component corresponds with the capability requirement attribute of the first data packet.

8. A computer system, comprising:
    a processor; and a memory, comprising instructions, which when executed by the process cause the computer system to perform a method of generating allocations between a plurality of data packets corresponding with execution loads and a plurality of execution components, the method comprising:
selecting a first data packet, wherein the first data packet corresponds with a first of the execution loads;
selecting a first execution component;
determining whether the selected first data packet is allocatable to the selected first execution component;
in response to the selected first data packet being determined to be allocatable to the selected first execution component:
allocating the selected first data packet to the selected first execution component as a first allocation, and
via an electronic communications network, communicating the first allocation to the first execution component; and
in response to the selected first data packet being determined to not be allocatable to the selected first execution component:
selecting a second data packet, wherein the second data packet corresponds with second of the execution loads,
selecting a second execution component,
wherein the second execution load is different from the first execution load, and
wherein the second execution component is different from the first execution component,
determining whether the selected second data packet is allocatable to the selected second execution component, and
in response to the selected second data packet being determined to be allocatable to the selected second execution component:
allocating the selected second data packet to the selected second execution component as a second allocation, and
via the electronic communications network, communicating the second allocation to the execution component, and
in response to the selected second data packet being determined to be not allocatable to the selected second execution component:
selecting a third data packet, wherein the third data packet corresponds with a third of the execution loads, and
selecting a third execution load.

9. The computer system of claim 8, wherein each execution component has an execution component availability, and selecting the first execution component comprises comparing the execution component availability of the execution components and selecting the execution component having the greatest availability.

10. The computer system of claim 8, wherein each data packet has a location associated therewith, and selecting the first data packet comprises comparing distances between the locations of a plurality of unallocated data packets and a location of the execution component most recently allocated, and selecting the unallocated data packet having a location closest to the location of the execution component most recently allocated.

11. The computer system of claim 8, the method further comprising generating a list of eligible execution components for each data packet, wherein determining whether the selected first data packet is allocatable to the selected first execution component comprises determining whether the selected first execution component is included in the list of eligible execution components for the selected first data packet.

12. The computer system of claim 11, wherein determining whether the selected first data packet is allocatable to the selected first execution component further comprises determining whether an availability of the first execution component accommodates the execution load of the first data packet.

13. The computer system of claim 12, wherein the availability of the first execution component is represented in a schedule having an event comprising:
a duration,
an earliest start time, and
a latest end time.

14. The computer system of claim 8, the method further comprising:
determining a capability requirement attribute for the first data packet; and
determining a capability attribute for the first execution component,
wherein determining whether the selected first data packet is allocatable to the selected first execution component comprises determining whether the capability attribute of the first data packet corresponds with the capability requirement attribute of the first execution load.

15. A non-transitory computer readable medium comprising instructions, which, when executed by a computer, causes the computer to perform a method of allocating a plurality of data packet to a plurality of execution components, the method comprising:
selecting a first data packet, wherein the first data packet corresponds with a first of the execution loads;
selecting a first execution component;
determining whether the selected first data packet is allocatable to the selected first execution component;
in response to the selected first data packet being determined to be allocatable to the selected first execution component:
allocating the selected first data packet to the selected first execution component as a first allocation, and
via an electronic communications network, communicating the first allocation to the first execution component; and
in response to the selected first data packet being determined to not be allocatable to the selected first execution component:
selecting a second data packet, wherein the second data packet corresponds with a second of the execution loads,
selecting a second execution component,
wherein the second execution load is different from the first execution load, and
wherein the second execution component is different from the first execution component,
determining whether the selected second data packet is allocatable to the selected second execution component, and
in response to the selected second data packet being determined to be allocatable to the selected second execution component:
allocating the selected second data packet to the selected second execution components as a second allocation, and via the electronic communications network, communicating the second allocation to the execution component, and in response to the selected second data packet being determined to be not allocatable to the selected second execution component:

selecting a third data packet, wherein the third data packet corresponds with a third of the execution loads, and selecting a third execution load.

16. The computer readable medium of claim 15, wherein each execution component has an execution component availability, and selecting the first execution component comprises comparing the execution component availability of the execution component and selecting the execution component having the greatest availability.

17. The computer readable medium of claim 15, wherein each data packet has a location associated therewith, and selecting the first data packet comprises comparing distances between the locations of a plurality of unallocated data packets and a location of the execution component most recently allocated, and selecting the unallocated data packet having a location closest to the location of the execution component most recently allocated.

18. The computer readable medium of claim 15, the method further comprising generating a list of eligible execution components for each data packet, wherein determining whether the selected first data packet is allocatable to the selected first execution component comprises determining whether the selected first execution component is included in the list of eligible execution components for the selected first data packet.

19. The computer readable medium of claim 18, wherein determining whether the selected first data packet is allocatable to the selected first execution component further comprises determining whether an availability of the first execution component accommodate the execution load of the first data packet.

20. The computer readable medium of claim 19, wherein the availability of the first execution component is represented in a schedule having an event comprising:

a duration, an earliest start time, and a latest end time.

21. The computer readable medium of claim 15, the method further comprising:

determining a capability requirement attribute for the first data packet; and determining a capability attribute for the first execution component, wherein determining whether the selected first data packet is allocatable to the selected first execution component comprises determining whether the capability attribute of the first data packet corresponds with the capability requirement attribute of the first execution load.

* * * * *